United States Patent [19]
Smith

[11] 4,157,414
[45] Jun. 5, 1979

[54] RESIN RICH POLYBUTADIENE-MICA FLEXIBLE HIGH VOLTAGE INSULATION

[75] Inventor: James D. B. Smith, Wilkins Township, Allegheny County, Pa.

[73] Assignee: Westinghouse Electric Corp., Pittsburgh, Pa.

[21] Appl. No.: 800,763

[22] Filed: May 26, 1977

[51] Int. Cl.² .................... B32B 27/14; B32B 25/02
[52] U.S. Cl. ............................. 428/283; 260/880 R; 260/879; 428/265; 428/271; 428/273; 428/363; 428/286; 428/521; 428/324
[58] Field of Search .............. 428/324, 327, 363, 495, 428/519, 492, 521, 412, 260, 271, 273, 480; 260/880 R, 894; 427/116, 121

[56] References Cited

U.S. PATENT DOCUMENTS

| | | | |
|---|---|---|---|
| 2,562,004 | 7/1951 | Watson, Jr. et al. | 428/324 |
| 2,835,642 | 5/1958 | Safford et al. | 428/324 |
| 3,079,295 | 2/1963 | Slotterbeck | 260/880 R |

*Primary Examiner*—George F. Lesmes
*Assistant Examiner*—P. Thibodeau
*Attorney, Agent, or Firm*—D. P. Cillo

[57] ABSTRACT

A resinous composition useful for impregnating flexible electrical winding tape is made by mixing:
(a) 100 parts of polybutadiene, (b) about 0.25 part to about 25 parts of a solid, organic, aromatic, vinyl monomer coreactive with polybutadiene, (c) a solvent for the polybutadiene and (d) an effective amount of organic reaction catalyst.

7 Claims, 4 Drawing Figures

RESIN RICH POLYBUTADIENE-MICA FLEXIBLE HIGH VOLTAGE INSULATION

BACKGROUND OF THE INVENTION

In the manufacture of large rotating machines, epoxy resins have long been used as impregnants for insulation which relies upon mica, in the form of paper, flakes or large splittings as the dielectric. In this art, epoxy acid anhydride systems are generally catalyzed with materials such as dicumyl peroxide and tetiary butylperbenzoate, as in U.S. Pat. No. 3,647,611, or with quaternary organic phosphonium compounds, as in U.S. Pat. No. 3,759,866. These catalyzed, epoxy; acid anhydride impregnants are then vacuum impregnated into prewound mica tape insulated coils.

Vacuum impregnation, however, is costly and time consuming, but has generally been considered necessary to get a void free insulating tape. Groff, in U.S. Pat. No. 3,660,220, used a mica-glass cloth tape, pre-impregnated with an epoxy resin-oil modified acid anhydride solution, as a pre-preg electrical insulation for motors. These solutions were catalyzed with stannous octoate, tertiary amines or boron trifluoride complexes. These catalysts, however, provide poor high temperature electrical dissipation (power) factor values, i.e., about 25% at 155° C. Also, these mica tapes would not retain their initial flexibility after storage.

While the epoxy pre-preg tape concept is an improvement in the art, it presents a host of problems with respect to tape tensile strength, void-free resin impregnation, maintenance of flexibility after solvent flash off, and retention of tape flexibility after long periods of storage i.e., over 6 months. What is needed, is a new type of resin-mica, catalyzed insulation tape, for high voltage motors and large rotating machines, that will retain flexibility after long term storage, and will provide improved power factor values.

SUMMARY OF THE INVENTION

Briefly, the above problems are solved by contacting flexible sheet insulation containing mica, with a homogeneous, polymerizable, admixture containing: (1) 100 parts of polybutadiene consisting essentially of 1,2-polybutadiene and 1,4-polybutadiene, (2) solvent for the polybutadiene, (3) about 0.05 part to about 25 parts of a solid, organic, aromatic vinyl monomer coreactive with polybutadiene and (4) an amount of organic reaction catalyst effective to cure the resinous admixture, at resin impregnant composition temperatures of over about 130° C. This impregnating composition is applied to a flexible mica sheet material to provide a final resin loading of between about 2 weight percent to about 40 weight percent.

Solvents in the composition applied to the mica tape are removed, generally by flash off heating, at a temperature and for a time effective to remove about 95% to about 99% of the solvent initially present in the tape. Solvent flash off can be accomplished at an impregnant temperature of from about 65° C. to about 120° C. for about 1 minute to 6 minutes, without substantially reacting the composition components. This provides a non-tacky, highly flexible, mica winding tape insulation.

This method can provide high voltage capability mica insulation that contains only up to about 5 weight percent solvent. It is resin saturated, highly flexible, and is tack-free at 25° C., having a shelf life of over about 6 months. The compositions will allow solvent flash off without any substantial resin cure. Upon cure to the thermoset state at resin temperatures over about 130° C., the mica insulation will provide truly impressive power factor values of below 2% at 150° C. The impregnated mica insulation possesses good solvent and chemical resistance properties, and excellent tensile strength, allowing it to be used on commercial coil taping machines.

BRIEF DESCRIPTION OF THE DRAWINGS

For a better understanding of the invention, reference may be made to the preferred embodiments exemplary of the invention, shown in the accompanying drawings in which.

DESCRIPTION OF THE PREFERRED EMBODIMENTS

Figure 1:
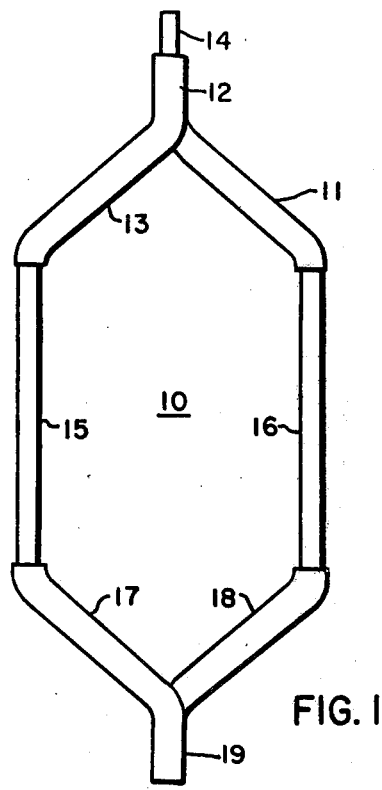
FIG. 1 is a plan view of a closed electrical member having two slot portions.

The base material used in this invention is polybutadiene containing from about 20 weight percent to about 98 weight percent of 1,2-polybutadiene and about 2 weight percent to about 80 weight percent of 1,4-polybutadiene. These materials have the following chemical formulas:

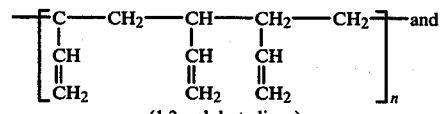
(1,2-polybutadiene)

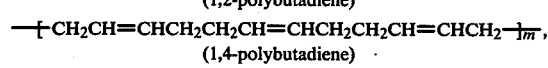
(1,4-polybutadiene)

where n can range from about 150 to about 500 and m can range from about 500 to about 5,000. These materials have been used alone as synthetic rubbers, as toughening agents for synthetic styrene-butadiene and nitrile-butadiene rubbers; and have been suggested for use as potting compounds, thin film coatings, paints, electrical insulating materials, and for use in paper and glass laminated articles. A complete description of their properties is given in *Plastics Materials* by J. A. Brydson, 1966, pages 261 to 267. Polybutadiene rubbers are made from butadiene ($CH_2=CHCH=CH_2$), and a number of different sterospecific polymer forms can be made. The 1,4-polybutadiene can exist in cis and trans form, and the 1,2-polybutadiene can exist in isotactic, syndiotactic and atactic forms. Use of the term "polybutadiene", will be meant to include mixtures of 1,4-polybutadiene and 1,2-polybutadiene in any of the above described or comparable forms.

These polybutadiene materials must be reacted with a small amount of a coreactive, solid, organic, aromatic vinyl monomer, in order to provide a non-tacky mica tape that will have a satisfactory shelf life. Preferred solid, organic, aromatic monomers include vinyl cabazole, which is the most preferred; 1-vinyl naphthalene;

2-vinyl naphthalene; vinyl anthracene including its various isomers; N-vinyl phthalimide, and their mixtures. They must be added in amounts of between about 0.25 part to about 25 parts, and preferably 0.5 part to 8 parts, per 100 parts of polybutadiene. Under about 0.25 part and the impregnated mica tape after solvent flash off will be tacky and will block upon rolling for storage. Over about 25 parts will begin to harm flexibility properties and shelf life properties of the impregnated mica tape.

It is the combination of polybutadiene and coreactive vinyl monomer which provides outstanding physical properties for this impregnating composition. The vinyl monomer contributes to improved tensile and bonding strengths by increasing the molecular weight and cross-link density of the impregnating composition in the cured state.

A reaction catalyst is needed to help gellation and promote curing at composition temperatures of over about 130° C. Peroxide compounds are used as a free-radical type catalyst for this polymerization reaction. Useful catalysts of this type include, among others, the following catalytic peroxides: benzoylperoxide, dicumylperoxide, lauroyl peroxide, methyl ethyl ketone peroxide and 2,5-dimethyl-2,5 bis(benzoylperoxy hexane), and mixtures thereof. Azo compounds, having the structural formula R—N=N—R where R can be alkyl or aryl, can also be used as the free radical type catalyst. Useful azo compounds include, among others:

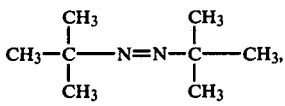

2-(tert-butylazo) isobutryonitrile
2-tert-butylazo-2,4-dimethylpentane and preferably 1-tertbutylazo-1-phenylcyclohexane.

The peroxide or azo catalyst or their mixtures must be effective to promote a gelling effect to the composition, at composition temperatures over about 130° C. The effective range of organic peroxide or organic azo catalyst is between about 0.25 part to about 5 parts, and preferably 1 part to 3 parts, per 100 parts polybutadiene. Over about 5 parts shortens the storage lifetime of the impregnated mica type. Under about 0.25 part causes very long cure rates. These catalysts may be used in pure or in commercial, plasticized paste form.

The polybutadiene system must be mixed with a solvent. The solvent can be selected from the group consisting of ketones; aliphatic hydrocarbons, such as hexane, heptane and octane; cycloaliphatic hydrocarbons, such as cyclohexane; aromatic hydrocarbons, such as benzene and arene; and cyclic ethers, such as dioxane and tetrahydrofuran, and their mixtures. The ketone will have from 3 to 6 total carbon atoms in the molecule. Particularly useful ketones are acetone, methyl ethyl ketone and methyl isobutyl ketone. The arene is preferably selected from the group of toluene, ethylbenzene, xylene and their mixtures. Ketones or arenes having higher molecular weights than those described above will present problems of solvent flash off without catalyzing the resin system, i.e., solvent removal would require temperatures of about 175° C., which would activate the catalyst and begin resin polymerization. Of all these above enumerated solvents, toluene is preferred.

The solvent content of the polybutadiene system must be within a weight ratio of polybutadiene:solvent of from about 75:25 to about 25:75, i.e., solvent content between about 25% to 75% by weight of the polybutadiene-solvent mixture based on total solvent plus weight of polybutadiene. Above 75% solvent, not enough polybutadiene will be impregnated into the mica, causing void formation. Under 25% solvent, the composition will be too viscous and will result in poor impregnant penetration, and uneven polybutadiene distribution through the mica. The viscosity of the impregnant solution of polymerizable resin must be between about 25 cps. to about 200 cps., but preferably between about 40 cps. to about 75 cps. at 25° C. By operating within this range, complete resin saturation of the tape can be attained i.e., about 25 weight percent to 40 weight percent of the tape can consist of polybutadiene, based on the weight of polybutadiene, backing and mica.

For some applications it may be advantageous to pre-impregnate the mica tape in an amount to provide a final polybutadiene loading of between about 2 weight percent to 25 weight percent, allowing later, further impregnation with suitable, known, catalyzed resins. Suitable post impregnants would include epoxy or styrene based resinous insulation compositions or solventless polyester, acrylic or other post impregnants including additional polybutadiene.

In the method of this invention: (1) the polybutadiene is mixed with the coreactive solid vinyl monomer and the solvent system, (2) the catalyst is added slowly with stirring to the solution at temperatures of up to about 35° C., to form a homogeneous admixture, (3) the solution admixture is applied, in an amount to provide a final resin loading in the range of about 2 weight percent to about 40 weight percent, to an insulation substrate, which will contain mica sheet in the form of paper, integrated flake paper, flakes, or large splittings, by any suitable means such as by brushing, dipping, spraying, etc., (4) the mica sheet insulation containing the contacting applied solution is generally heated at a temperature and for a time, generally about 1 minute to 6 minutes, at a mica sheet and impregnant temperature of between about 65° C. to 120° C. i.e., an oven temperature of between about 85° C. to 140° C., effective to drive off or flash off substantially all, i.e., at least about 95 weight percent of the solvent. Solvent could also be removed by gas pressure drying or by a suitable vacuum process. At least about 95 weight percent of the solvent present in the solution must be removed to form a composition of about 95 to 99 percent solids at this point, so that there is minimal solvent removal upon final curing of the insulation.

Finally, the insulation is cooled to room temperature, at which time it is highly flexible, tack-free and can be wound onto a takeup reel without blocking or sticking, and stored for up to 1 year without losing flexibility and tack-free properties. It can then be applied, either by hand or using commercial coil wrapping machines, to coils and other metallic electrical conductors as a curable, fully loaded pre-preg, which does not require vacuum resin impregnation. After flush off, the polybutadiene is in a fusible, dry, substantially uncured state, i.e., no more than about 2 weight percent to about 10 weight percent of the polybutadiene, vinyl monomer and catalyst react.

The polybutadiene will contain up to about 5 weight percent solvent residue based on polybutadiene, vinyl monomer, mica, solvent, catalyst weight. The polybutadiene in the mica sheet is capable of being fully cured, generally at a resin temperature of at least 130° C., for 2 hours to 35 hours, to remove the solvent residue and to form an infusible resin, by complete catalytic polymerization with the catalyst. During cure the mica and resin temperatures shortly reach the oven or press temperatures.

One type of a closed full coil 10 which may be prepared in accordance with the present invention is illustrated in FIG. 1. The full coil is a copper or aluminum electrical conductor wrapped with winding tape, and comprises an end portion comprising a tangent 11, a connecting loop 12 and another tangent 13 with bare leads 14 extending therefrom. Straight slot portion 15 and 16 of the coil which have been hot pressed to cure the resin and to form them to predetermined shape and size, are connected to the tangents 11 and 13, respectively. These slot portions are connected to other tangents 17 and 18 connected through another loop 19.

The complete full coils prepared as disclosed herein, with cured slot portions and uncured end portions are placed within the slots of the stator, rotor or armature of an electrical machine and the end windings wrapped and tied together. The uninsulated leads are then soldered, welded or otherwise connected to each other or to the commutator. Thereafter, the entire machine will be placed in an oven and heated to a temperature effective to cure the completely reactive composition applied to the end portions.

Figure 2:
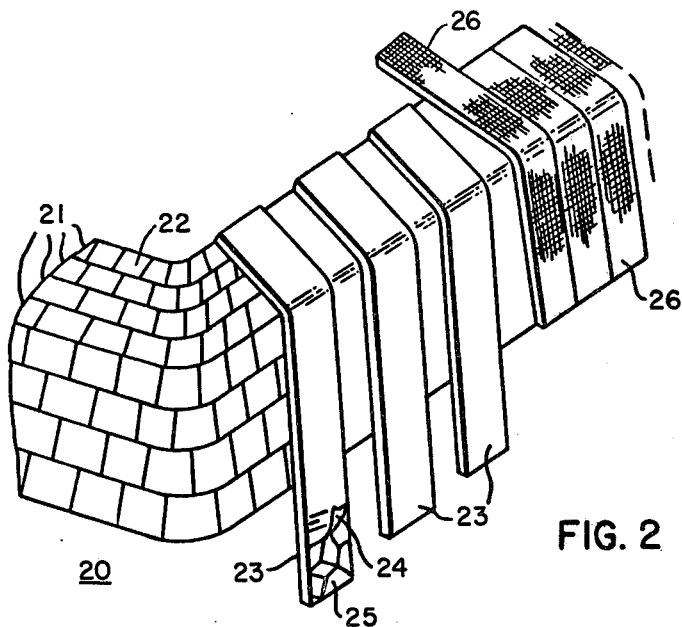
FIG. 2 is a fragmentary view in perspective showing part of an electrical coil member being wound with the highly flexible, impregnated mica tape of this invention.

Referring to FIG. 2 of the drawings, there is illustrated a coil 20, comprising a plurality of turns of conductors 21. Each turn of the conductor 21 consists essentially of a copper or aluminum bar or wire wrapped with turn insulation 22. The turn insulation 22, preferably is prepared from a fibrous sheet or strip impregnated with a bonding resinous insulation. While the bonding resinous insulation may consist solely of a coating of uncured varnish or resin, it is preferred that it comprise a wrapping of fibrous material treated with a bonding resin. Glass fiber cloth, paper asbestos cloth or asbestos paper treated with a resin may be used with equally satisfactory results. The resin applied to the turn insulations to bond them together may be a phenolic resin, an alkyd resin, a melamine resin or the like, or mixtures of any two or more of these.

The turn insulation is not adequate to withstand the severe voltage gradients that will be present between the conductor and ground when the coil is installed in a high-voltage electrical machine. Therefore, ground insulation for the coil is provided by wrapping one or more layers of flexible micaceous insulation, such as mica paper or preferably a composite mica tape 23 about the conductors 21. Such composite tape 23 comprises a pliable backing sheet 24 of for example, cellulose paper, asbestos paper, cotton or linen fibric, glass cloth or fibers or polyethylene terephthalate mat, having a layer of integrated mica flake paper, mica splittings or mica flakes 25 bonded thereto by a liquid resinous binder. The tape in this case is pre-impregnated with up to about 40 weight percent of the polybutadiene composition of this invention. The tape may be applied half lapped, abutted or otherwise. Generally, a plurality of layers of the flexible composite tape 23 are wrapped about the coil, with five or more layers generally being used for high-voltage electrical machines. To impart better abrasion resistance and to secure a tighter insulation, an outer wrapping of a tape 26 of a tough fibrous material, for example, glass fiber, asbestor or the like is applied to the coil.

The mica insulation is preferably in the form of a winding tape of the order of one-half inch to two inches in width, though sheet insulation of any other width may be prepared. In a continuous operation, the polybutadiene solution can be applied to the mica material on a continuous belt which contacts the mica material with moving support material, and causes an adhesive bond between the mica and support, followed by solvent flash off by passage through a heating or vacuum means.

For a building electric machines, sheet backing material of a thickness of approximately 1 mil (0.001 in. or 0.0025 cm.), to which there has been applied a layer of from 3 to 10 mils thickness of mica has been successfully employed. Mica flakes are generally about 1/16 to 3/4 inch square while mica splittings are generally about 3/4 inch to 3 inches square. Integrated mica flake paper is made of compacted mica particles about 1/32 inch to 1/2 inch square and fine mica paper is made of compacted mica particles about 1/64 inch to 1/16 inch square. All of these forms of mica are useful in this invention.

In one embodiment of this invention, the mica tape is impregnated with the liquid, completely reactive polymerizable compositions of this invention so that there is complete saturation between mica layers. Afer impregnation the solvent is flashed off and the pre-preg tape is stored or wrapped around the coil or other conductor. The insulated coil, after wrapping, is then exposed to the application of heat and pressure, to provide a thermally stable, tough, cured insulation. No vacuum impregnation step is needed in this embodiment.

Coils insulated with the impregnated mica wrapping of this invention are placed in a hot press in which the slot portions are subjected to heat and pressure for a period of time to cure the composition in the slot portions. The end portions of the windings will be substantially uncured. This hot pressing operation produces a coil having a slot portion of the exact size required for the electrical machine and can be fitted into the slots of the electrical machine readily with flexing of the end portions.

Figure 3:
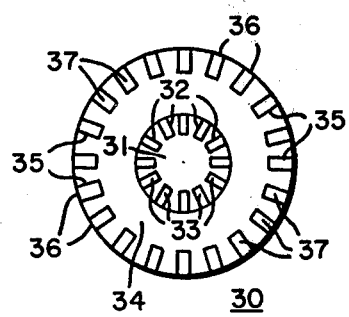
FIG. 3 is a cross sectional view of a motor containing coils wound with mica tape impregnated with the composition of this invention.
Figure 4:
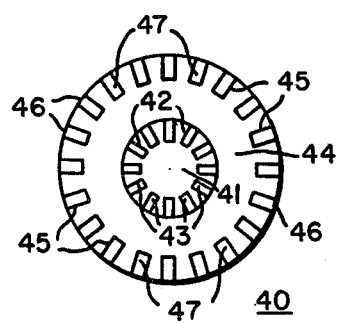
FIG. 4 is a cross sectional view of a generator containing coils wound with mica tape impregnated with the composition of this invention.

FIG. 3 shows one embodiment of a motor 30 in cross section. The motor comprises a metal armature 31 having slots 32 therein, containing insulated coils 33, surrounded by a metal stator 34 having slots 35 therein about the stator circumference at 36. The stator slots contain insulated coils 37. All the insulation on the coils 33 and 37 can comprise mica tape composites impregnated with the resinous compositions of this invention. FIG. 4 shows on embodiment of a generator 40 in cross section. The generator comprises a metal rotor 41 having slots 42 therein, containing insulated coils 43, surrounded by a metal stator 44 having slots 45 therein about the stator circumference at 46. The stator slots contain insulated coils 47 and may also contain inner cooling channels not shown. All the insulation on the coils 43 and 47 can comprise mica tape composites impregnated with the resinous compositions of this invention.

EXAMPLE 1

Impregnant formulations were made containing: polybutadiene consisting of about 50 weight percent to 75 weight percent of 1, 2-polybutadiene and about 25 weight percent to 50 weight percent of 1,4-polybutadiene, having a molecular weight of between about 13,000 to 25,000, and a viscosity of about 5,000 cps. to 8,000 cps. at 100° C. (samples 1, 2, 3, 4 and 5) or with polybutadiene containing about 60 weight percent to 80 weight percent of 1,2-polybutadiene and about 20 weight percent to 40 weight percent of 1,4-polybutadiene, having a molecular weight of between about 15,000 to 25,000, and a viscosity of about 10,000 cps. at 100° C. (sample 6); benzoyl peroxide or plasticized dicumyl peroxide catalyst; toluene as solvent and various percentages of solid vinylcarbazole or 1-vinyl naphthalene reactive monomer, as shown in Table 1 below:

TABLE 1

| Sample | Polybutadiene parts | Toluene parts | Reactive monomer parts | Catalyst parts |
|---|---|---|---|---|
| 1 | 100 | 100 | 2 p. vinylcarbazole | 2 p. benzoyl peroxide |
| 2 | 100 | 100 | 2 p. vinylcarbazole | 2 p. dicumyl peroxide |
| 3 | 100 | 100 | 6 p. vinylcarbazole | 2 p. dicumyl peroxide |
| 4 | 100 | 100 | 4 p. 1-vinyl-napthalene | 2 p. benzoyl peroxide |
| 5 | 100 | 100 | none | 2 p. dicumyl peroxide |
| 6 | 100 | 100 | none | 2 p. dicumyl peroxide |

The viscous polybutadiene liquid and toluene were mixed at 25° C. The vinylcarbazole or 1-vinylnapthalene was heated to 150° C. for about six minutes, until it liquefied, before adding to the Sample 1 to 4 polybutadiene solution at 25° C. Then, the catalyst was added with stirring at 25° C. to produce a homogeneous admixture. The viscosities of the 50% solids compositions were between about 40 cps. to 60 cps. at 25° C.

Using 108 type-glass woven fabric as backing material; 4"×4" glass strips were bonded to integrated flake mica paper by brushing the above described homogeneous impregnating compositions onto the mica, through the glass fabric. The compositions appeared to easily wet the mica and uniformly distribute between the mica particles and layers, impregnating without formation of any voids. The mica was in the form of integrated mica flake paper about 0.005 inch thick and composed of compacted flakes between about 1/16 to ½ inch square.

The solvents were then substantially removed, i.e., about 98% of their initial amount, by placing the impregnated mica strips in a forced air oven for 6 minutes at an oven temperature of 150° C. The actual temperature of the mica sheet strips and resin would be close to 100° C., since the solvent evaporation cools the strips. The samples contained from about 22 weight percent to 29 weight percent catalyzed composition including solvent residue, as determined by initial weight and final weight measurement after solvent flash off.

After solvent flash off, the pre-preg strips were found to be blister-free. Samples 1 to 5 were highly flexible, i.e., the strips could be wound around a ½ inch mandrel without creasing or cracking. Samples 1, 3 and 4 were non-tacky, Sample 2 was slightly tacky, but strips could still be placed on one another without sticking or blocking. Sample 5 was very tacky and would have poor storage properties. Sample 6 was stiff, had a tendency to delaminate, was very tacky and unevenly impregnated. The reactive monomer appears to substantially contribute to both flexibility, non-tackiness and tensile strength properties in the loaded pre-preg tape. The polybutadiene-reactive monomer catalyst compositions were substantially unreacted after flash off, i.e., no more than about 10% of the polybutadiene reacted or crosslinked.

Composites were then made with some of these mica strips for power factor (100 tan δ) and dielectric constant (ε') measurements (ASTM designation D150-65T). This was done by stacking 4 pieces of impregnated mica strip on top of each other and curing them between metal plates in a Carver Press for 30 minutes at 200° C. and 200 lb./sq. in., and then for 16 hours at 160° C. and 0.50 lb./sq. in., to form a cured composite. Here, the temperature of the strips and resin would be 150° C. after about 15 minutes. The resulting cured laminated composite thickness was about 0.023 inch. Breakdown voltages were measured on the composites at 25° C. under hydrocarbon oil, using a voltage rise of 1 kV/sec. using a 1 inch diameter round edged electrode. The results are shown in Table 2 below:

TABLE 2

| Sample | Electrical Properties 100 × tan δ | 150° C. ε' | Breakdown Voltage kV (rms) | Dielectric Strength Volts/mil (rms) |
|---|---|---|---|---|
| 1 | 1.06% | 2.3 | 19.5 | 848 |
| 3 | 0.98% | 2.9 | 18.0 | 811 |
| 4 | 1.22% | 2.7 | 18.8 | 823 |

These power factor and dielectric strength values are surprisingly and truly outstanding, since excellent high voltage capability, resin rich, expoxy-mica samples of the same thickness would provide power factors (100×tan δ) of from 4% to 30% at 150° C., and lower dielectric strengths, in the range of about 400 Volts/mil to 500 Volts/mil. The formulations of this invention would provide outstanding insulation for motor and generator coils in high voltage machines.

Portions of the catalyzed, polybutadiene impregnated, flexible insulating tape were stored at 25° C. for 6 months without losing noticeable flexibility, and could still be used after that time period for winding coils. Tensile strength of the pre-preg tapes was found to be adequate for automatic commercial coil wrapping machines. Other ingredients, such as vinyl anthracene, vinyl phthalimide as coreactive monomers; azo compounds as catalysts and hexane or the other solvents described hereinabove could be used to make the compositions of this invention.

I claim:

1. A void free high voltage capability electrical pre-preg winding insulation tape, comprising mica, and a contacting polymerizable resinous composition consisting essentially of a homogeneous, substantially unreacted mixture of polybutadiene consisting of from about 20 weight percent to about 98 weight percent of 1,2-polybutadiene and from about 2 weight percent to about 80 weight percent of 1,4-polybutadiene; about 0.25 part to about 25 parts per 100 parts of total polybutadiene of a solid vinyl monomer coreactive with polybutadiene selected from the group consisting of vinyl carbazole, 1-vinyl naphthalene, 2-vinyl naphthalene, vinyl anthracene, N-vinyl phthalimide and mixtures thereof; up to about 5 weight percent of solvent for the polybutadiene and an amount of an organic reaction catalyst effective to cure the resinous mixture, at resin composition temperatures of at least about 130° C., said pre-preg being dry and highly flexible, having a shelf life of at least 6 months.

2. The highly flexible winding tape of claim 1, wherein the reaction catalyst is a free radical catalyst selected from the group consisting of catalytic peroxides, azo compounds having the structural formula R—N=N—R where R can be alkyl or aryl, and mixtures thereof, and wherein the catalyst is added at between about 0.25 part to about 5 parts per 100 parts of polybutadiene.

3. The highly flexible winding tape of claim 1, wherein the vinyl monomer coreactive with polybutadiene is selected from the group consisting of vinyl carbazole, 1-vinyl naphthalene, and mixtures thereof, the reaction catalyst is selected from the group consisting of benzoyl peroxide; dicumyl peroxide; lauroyl peroxide, methyl ethyl ketone peroxide; 2,5-dimethyl-2,5 bis(benzoylperoxy hexane); 2-(tert-butylazo) isobutryonitrile; 2-tert-butylazo-2,4-dimethylpentane; 1-tert-butylazo-1-phenylcyclohexane and mixtures thereof.

4. The highly flexible winding tape of claim 1, wherein the winding tape, is non-tacky and can be wound onto a reel without sticking to itself, and the power factor values of the winding tape upon cure are below 2% at 150° C.

5. The highly flexible winding tape of claim 1, wherein the tape comprises mica supported by a backing selected from the groups consisting of cellulose paper, cotton fabric, linen fabric, asbestos paper, glass cloth, glass fibers, mica paper, nylon fabric, polyethylene fabric and polyethylene terephthalate mat, said winding tape containing from about 2 weight percent to about 40 weight percent of the resinous composition.

6. The highly flexible winding tape of claim 1 containing from about 2 weight percent to about 25 weight percent of the resinous composition and also further impregnated with a resin selected from the group consisting of catalyzed epoxy resin, polyester resin and polybutadiene resin.

7. The highly flexible winding tape of claim 1 wrapped around an electrical conductor consisting of copper and aluminum, and cured at a resin composition temperature of at least about 130° C.

* * * * *